No. 876,632.
PATENTED JAN. 14, 1908.
F. C. GOFF.
PROCESS OF TREATING ANIMALS.
APPLICATION FILED JULY 16, 1907.
4 SHEETS—SHEET 1.
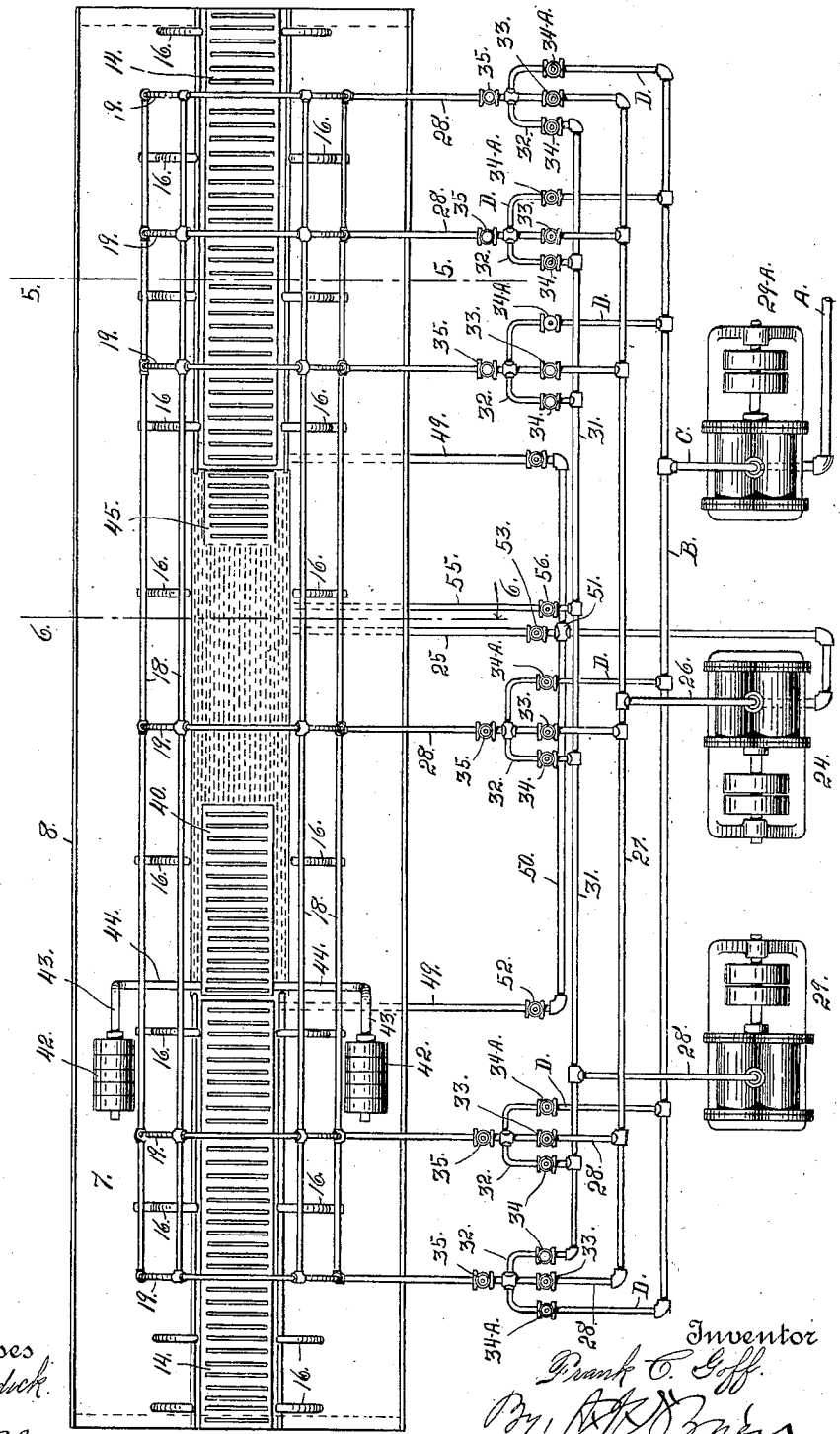
Witnesses
Otto E. Haddock.
Dena Nelson.
Inventor
Frank C. Goff.
By
Attorney No. 876,632.
F. C. GOFF.
PROCESS OF TREATING ANIMALS.
APPLICATION FILED JULY 16, 1907.
PATENTED JAN. 14, 1908.
4 SHEETS—SHEET 2.
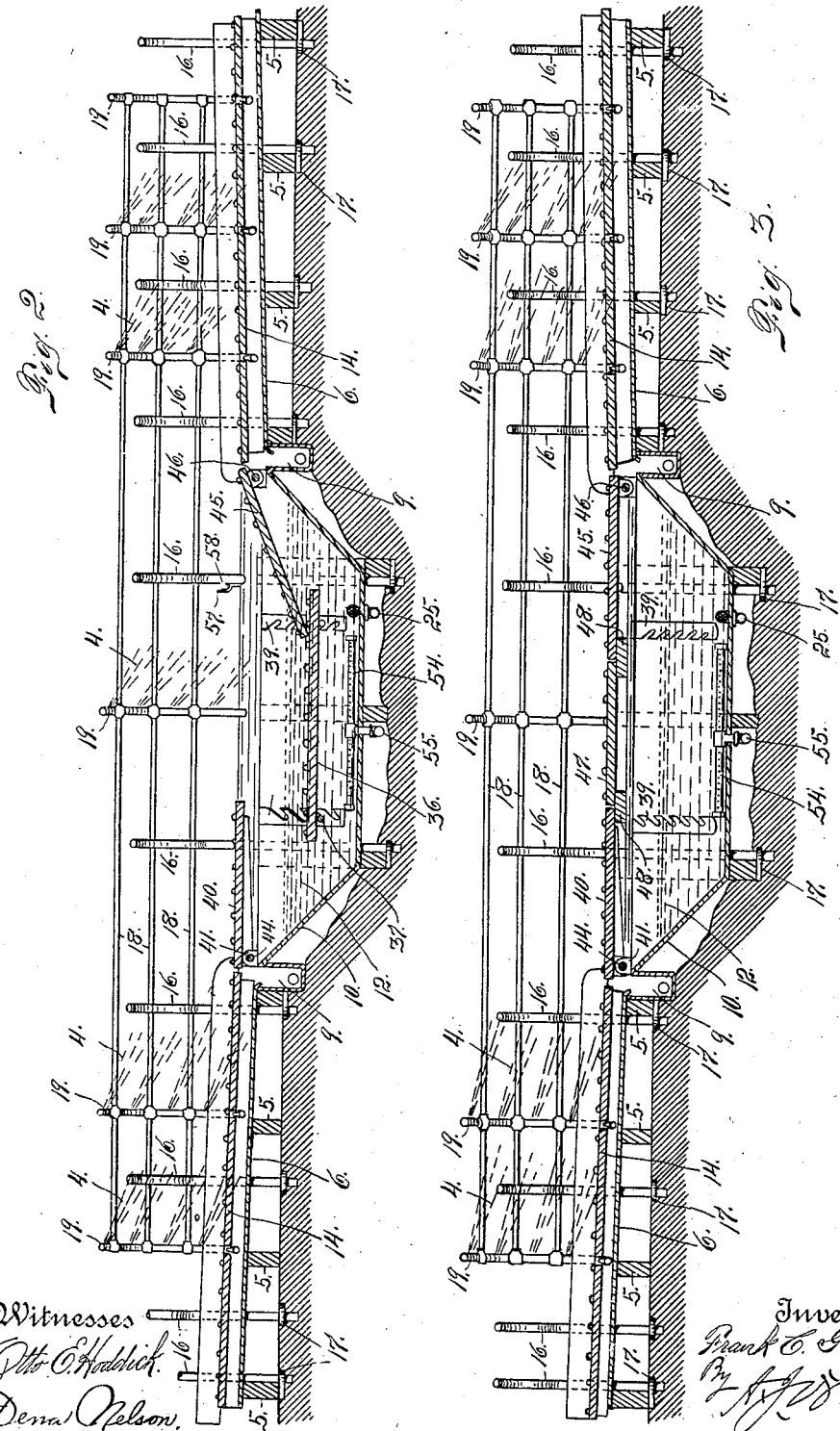

No. 876,632. PATENTED JAN. 14, 1908.
F. C. GOFF.
PROCESS OF TREATING ANIMALS.
APPLICATION FILED JULY 16, 1907.
4 SHEETS—SHEET 3.
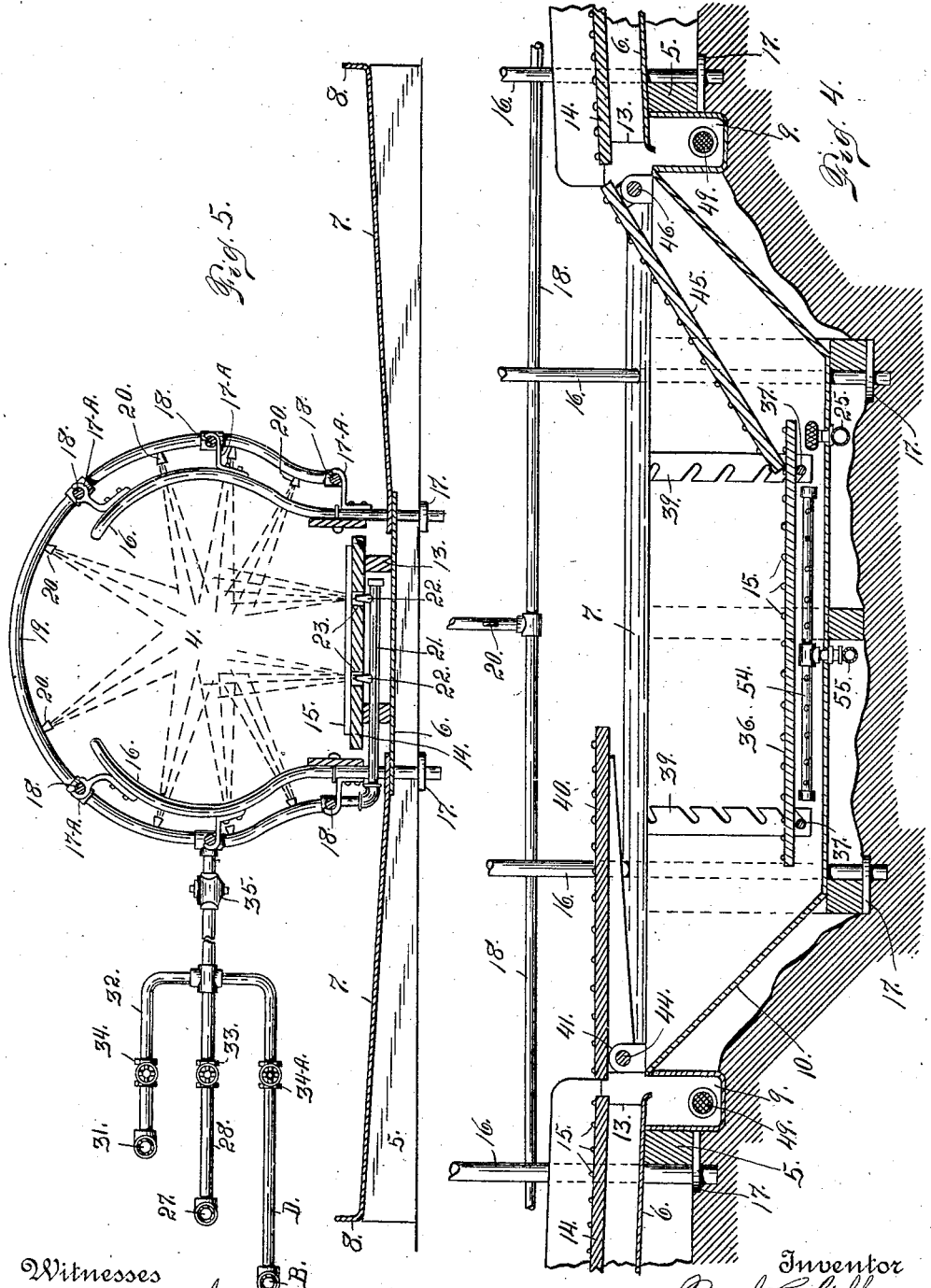
Witnesses
Otto E. Hoddick.
Dena Nelson.
Inventor
Frank C. Goff.
By
Attorney

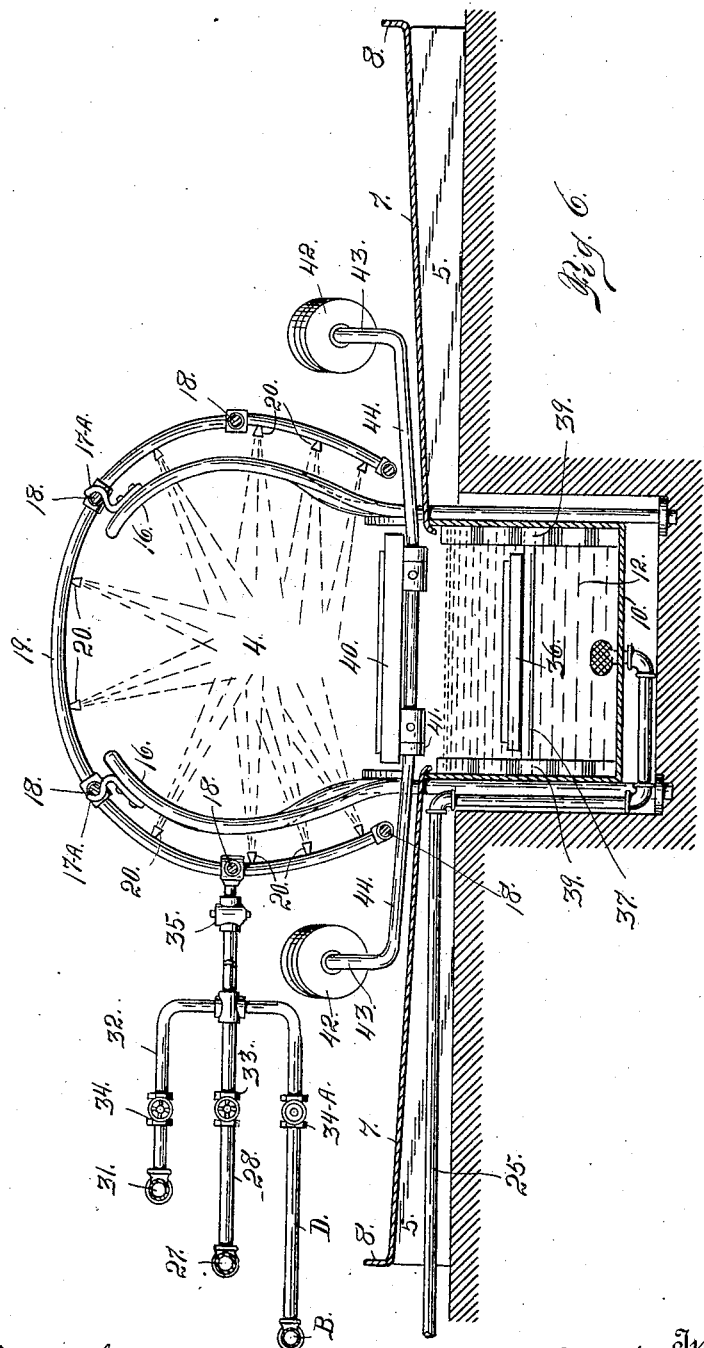

UNITED STATES PATENT OFFICE.

FRANK C. GOFF, OF DENVER, COLORADO.

PROCESS OF TREATING ANIMALS.

No. 876,632.  Specification of Letters Patent.  Patented Jan. 14, 1908.

Application filed July 16, 1907. Serial No. 384,061.

*To all whom it may concern:*

Be it known that I, FRANK C. GOFF, a citizen of the United States, residing at the city and county of Denver and State of Colorado, have invented a certain new and useful Process of Treating Animals; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a process of treating animals for the purpose of killing insects, destroying their eggs or larvæ and for the purpose of curing skin diseases to which they are liable or subject.

My improved process includes a number of features among which I may mention the following:

First, the treatment of the animals by subjecting them to the action of a liquid insecticide by a partial immersion and partial spraying. That is to say by immersing the lower portion of the body while the portion above the level of the immersing liquid is subjected to the action of liquid sprays or jets.

Second, subjecting the animals to the combined action of fluid sprays consisting of liquid and gas combined in suitable proportions and under pressure.

Third, first subjecting them to the action of a cleansing fluid, and second to the action of the liquid insecticide either in the form of sprays of liquid alone, liquid and gas combined or partly in the form of sprays and partly in the form of immersion.

Fourth, subjecting them to the action of a cleansing fluid consisting of gas or water, or gas and water combined, then to the action of the liquid insecticide in any desired form and finally to the action of a gas preferably air for spreading the liquid upon their bodies and at the same time removing the superfluous liquid.

While in the practice of my improved process I am not limited to the use of any specific apparatus, I will now describe appropriate means for carrying out the process and the same will be fully understood by reference to the accompanying drawing in which is illustrated an embodiment thereof.

In this drawing, Figure 1 is a top plan view of my improved apparatus. Fig. 2 is a vertical longitudinal section of the same. Fig. 3 is a similar view showing the centrally located insecticide tank, covered so that the animals may pass through without entering the tank. Fig. 4 is a view similar to Fig. 2 but shown on a larger scale, the extremities of the construction being broken away to make room on the sheet. Fig. 5 is a cross section taken on the line 5—5 Fig. 1, the parts being shown on a larger scale. Fig. 6 is a section taken on the line 6—6 Fig. 1, on the same scale as Fig. 5.

The same reference characters indicate the same parts in all the views.

Let the numeral 5 designate suitable sills or transversely located beams, which form a support for bottom plates 6 located at the opposite extremities of the apparatus and inclined downwardly longitudinally from said extremities. Extending outwardly on opposite sides of these plates 6, are platforms 7 whose outer edges are upturned to form flanges as shown at 8. From these flanges the platforms are downwardly inclined and overlap the plates 6, whereby any liquid which passes beyond the boundaries of the said plates, is returned to the plates and caused to pass downwardly into troughs 9, located at the opposite extremities of the central tank 10 containing the liquid insecticide 12. A portion of the liquid is also returned by the platforms directly to the tank.

Above the plates 6 and resting upon longitudinal sills or beams 13 are located front and rear platforms 14 which are downwardly inclined slightly in the direction of the tank 10. These platforms are provided with transverse ribs 15, to prevent the animals from slipping while passing through the runway.

The beams 5 provide means for the support of stanchions 16 whose extremities as shown in the drawing are provided with plates 17 which are secured to the said beams. These stanchions project upwardly on opposite sides of the platforms 14 and are preferably outwardly curved intermediate their extremities. They are provided with outwardly projecting brackets 17ᴬ, which form the support for longitudinally disposed bars 18 which support transversely disposed bow-shaped pipes or conduits 19 which extend over the runway or space between the stanchions. These bow-shaped members 19 are provided with spray nozzles 20 from which the fluid whether in the form of gas or liquid, may be delivered to the animals passing through the runway. Each conduit member 19 also has a portion 21 extending underneath the platform 14 and provided with upwardly projecting nozzles 22 which pass through openings 23 formed in the platform 14, whereby the sprays or jets of gas or liquid, may be delivered to the lower portions of the bodies of the animals. The bow-shaped nozzle-holding conduits, may be located at any desired intervals along the runway.

Let the numeral 24 designate a pump adapted to remove the liquid insecticide 12 from the tank 10, by way of a pipe 25, and deliver it by way of a pipe 26, to a longitudinally disposed conduit 27, from which branch conduits 28 lead to the bow-shaped conduit members 19 for supplying the spray nozzles. As a large portion of the liquid from these nozzles is returned again to the tank through the instrumentality of the mechanism heretofore described, it will be seen that the pump 24 causes the liquid to travel in an endless circuit.

Let the numeral 29 designate an air pump provided with an exit pipe 30 leading to a longitudinally disposed conduit 31, from which lead branch pipes 32, to each pipe 28, for the purpose of mixing air with the liquid when desired. Each pipe 28 is provided with a valve 33 located between the liquid conduit 27 and the point where the air pipe 32 enter the pipe 28. The branch air pipe 32 is also provided with a valve 34 interposed between the conduit 31 and the pipe 28. By means of this valve the air may be entirely shut off from the pipe 28, whereby liquid only is delivered to the bow-shaped conduits.

Let the numeral 29$^A$ designate a third pump, which may be connected with a suitable water supply by an inlet conduit A and with a longitudinally disposed pipe B by a conduit C. This pipe B is connected with each pipe 28 by a branch pipe D. Each of these branch pipes D contains a valve 34$^A$, the branch pipe D being connected with the pipe 28 between the valve 33 and the pump 29$^A$. By means of these valves 34$^A$ the water may be entirely cut off from the pipes 28 if desired. The valves 33, 34 and 34$^A$ are also pressure-reducing valves whereby the pressure of the air, the liquid insecticide and the water may be regulated at will. By virtue of these reducing valves it becomes practicable to use air and liquid together, the liquid being either the liquid insecticide or the water or both as may be desired, since the pressure of the air and both or either liquid may easily be made equal by the use of said valves whereby the air and liquid may work in harmony. If either the air or liquid is under more powerful pressure than the other, the fluid under greater pressure would act on the fluid under less pressure and interfere with the passage thereof. It is therefore important that the pressure of the air or other gas and that either or both liquids, shall be equal or approximately equal.

Each pipe 28 is provided intermediate the point where the air pipe 32 and the water pipe D enter the same, and the bow-shaped conduit, with a valve 35 which may be utilized to cut off the passage of fluid to the bow-shaped conduits whenever desired.

Having once adjusted the pressure-reducing valves 33, 34 and 34$^A$, no further attention need be given these valves during any particular spraying operation since the passage of the fluid to the bow-shaped conduits may be completely controlled by the use of the cut off valves 35.

Within the tank 10, is located a vertically adjustable platform 36, the height of which as shown in the drawing, may be regulated by placing supporting bars or rods 37, in different positions in the notched or recessed hangers 39 located at the opposite sides of the tank. By virtue of the adjustability of this platform, the depth of liquid through which the animals are caused to wade, may be regulated at will to correspond with the height of the animal. This platform 36 is also provided with transverse ribs 15 the same as the platform 14.

Mounted above the forward end of the tank 10, is an auxiliary platform 40 normally supported in the plane of the adjacent platform 14, by weights 42 respectively connected with crank arms 43 formed on the opposite extremities of a rock shaft 44 to which the platform 40 is made fast, the said shaft being journaled in the sides of the tank 10 whereby the said platform is hinged to move downwardly with the weight of the animal, the weights 42 being so adjusted as to bring about this result. For this purpose each weight 42 is composed of any desired number of readily detachable and replaceable sections. This hinged platform is an important feature, since by virtue thereof, the animal will readily walk thereon and move downwardly by his own weight into the liquid of the tank; whereas if it were not for the platform, much difficulty might be experienced in causing the animal to walk unassisted into the tank. As the platform moves downwardly, to the inclined position, the animal will pass immediately to the adjustable platform member 36, and then pass on to a second inclined platform 45 hinged to the tank as shown at 46. The inner extremity of this last named platform normally rests upon the platform member 36.

When it is not desired to partially immerse the animals in the liquid of the tank 10, the two hinged platforms 40 and 45, may be raised to the position shown in Fig. 3, and an intermediate platform member 47 placed in position and supported by suitable cross pieces 48 resting upon the opposite sides of the tank. By virtue of this last named construction, the animals walk over or above the liquid in the tank and they are treated by the fluid jets from the spray nozzles alone.

When the same liquid is used in spraying the animals on both end platforms 14 as that contained in the tank 10, the liquid in the troughs 9 is taken therefrom through the action of the pump 24, by virtue of two pipes 49 which communicate with the said troughs and lead to a longitudinal pipe 50 which is connected with the induction pipe 25 as shown at 51. If it is desired to pump the liquid from the tank and not from the troughs, valves 52 located in the pipes 49 are closed; while if it is desired to pump from the said troughs and not from the tank, a valve 53 located in the pipe 25 between the pipe 50 and the tank, is closed; while if it is desired to pump from the troughs and tank simultaneously, all of the said valves are left open.

In the bottom of the tank 10, is located a perforated pipe 54 adapted to receive air from a longitudinal air conduit 31, by way of a branch pipe 55. In this last named pipe is located a valve 56 which if left open, will allow the air to pass freely through the pipe 54, with the result that the liquid in the tank will be agitated, whereby the beneficial results thereof on the animal may be enhanced.

From the foregoing description the manner of practicing my improved process will be readily understood. For the purposes of this description it will be assumed that the animals enter the runway at the left referring to Figs. 1 to 4 inclusive. As they pass along the front platform 14, they may be subjected to the treatment of air alone; water alone; air and liquid insecticide combined; water and liquid and insecticide combined, or air, water and liquid insecticide combined under pressure as may be desired; and either of these treatments may continue while the animals are passing entirely through the runway. While passing through the central part of the runway, the animals may be caused to enter the liquid insecticide in the tank 10, whereby their bodies are partially immersed in the liquid while the upper portions of their bodies above the liquid are subjected to the action of liquid sprays; or the tank may be covered as shown in Fig. 3, whereby the animals walk over the liquid in the tank, receiving treatment from the sprays only. After passing over the central part of the runway, the animals may be treated to the action of air only from the pipe 29 if desired, for the purpose of spraying the liquid upon their bodies and also for the purpose of removing superfluous liquid. Or as heretofore stated the liquid treatment either in combination with air or air and water may be continued while the animals are passing through the entire length of the runway. The different treatments heretofore outlined to which the animals may be subjected, may be brought about by manipulating the valves 33, 34 and 34ᴀ. For instance if all of these valves are open, the animal would be subjected to the treatment of air, water, and liquid insecticide combined; if the valve 34ᴀ only is closed, the treatment would be air and liquid insecticide combined; if the valve 34 were closed while 34ᴀ and 33 are open, the treatment would be water and liquid insecticide combined. In this case the water would serve to dilute the liquid insecticide when for any purpose this might be advantageous. From the foregoing it will also be evident that the treatment of the animal while passing through the runway may be varied as much as desired, that is to say the treatment in the front part of the runway may consist of sprays composed of a single fluid only; in another part of the runway it may consist of two or three fluids combined delivered in the form of spray, while in another part of the runway it may consist of a single fluid in the form of spray while a portion of the animal's body is subjected to the direct action of the liquid insecticide by partial immersion. It is thought that the process will be thoroughly understood from the foregoing description.

Having thus described my invention, what I claim is:

1. A process for the treatment of live stock, consisting in first subjecting the animals to the action of a gas in the form of spray, and subsequently applying liquid in the form of spray.

2. A process for the treatment of live stock, consisting in first subjecting the animals to the action of a gas in the form of spray for cleansing purposes; second, applying liquid in the form of spray; and finally again subjecting them to the action of sprays of gas.

3. A process for the treatment of live stock, consisting first in subjecting the animals to the action of gas in the form of spray; second, applying liquid in the form of spray to the upper part of the animals and immersing the lower parts in a liquid, substantially as described.

4. A process for the treatment of live stock, consisting in first subjecting the animals to sprays of gas; second, subjecting them to the action of liquid by applying sprays thereof to a portion of the animal, while the other portion is immersed in the liquid; and finally applying a gas under pressure to the animals whereby the surplus liquid is removed.

5. A process for the treatment of live stock, consisting in first subjecting the animals to the action of a cleansing fluid delivered in the form of sprays, and subsequently subjecting them to the action of liquid sprays.

6. A process for the treatment of live stock, consisting in first subjecting the animals to the action of a cleansing fluid delivered in the form of sprays; subsequently subjecting them to the action of liquid sprays; and finally subjecting them to air sprays for the purpose of removing the surplus liquid.

7. A process for the treatment of live stock, consisting first in subjecting them to the action of a cleansing fluid delivered in the form of sprays; and second, subjecting them to the action of a liquid insecticide in the form of sprays, the insecticide being delivered after the cleansing fluid.

8. A process for the treatment of live stock, consisting in first subjecting the animals to the action of a cleansing fluid; second, applying liquid insecticide in the form of sprays to the upper portion of the animal and immersing the lower portion; and finally applying to the animals, air sprays under pressure for the purpose of removing the surplus liquid in the hair or coat of the animals, substantially as described.

9. The herein described process for the treatment of live stock, consisting of subjecting the animals to fluid sprays composed of gas and liquid combined under pressure and subsequently subjecting them to the action of sprays of air.

In testimony whereof I affix my signature in presence of two witnesses.

FRANK C. GOFF.

Witnesses:
  A. J. O'BRIEN,
  DENA NELSON.